(12) United States Patent
Hagemann

(10) Patent No.: US 6,577,724 B1
(45) Date of Patent: Jun. 10, 2003

(54) METHOD AND APPARATUS IN A COMMUNICATION NETWORK FOR SWITCHING MESSAGES TO COMMUNICATION TERMINAL EQUIPMENT

(75) Inventor: Joachim Hagemann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/292,869

(22) Filed: Apr. 16, 1999

(30) Foreign Application Priority Data

Apr. 17, 1998 (DE) .......................................... 198 17 156

(51) Int. Cl.⁷ .......................... H04M 7/00; H04M 11/00
(52) U.S. Cl. ..................................... 379/229; 379/93.09
(58) Field of Search ................................. 379/229, 230, 379/219, 211.02, 212.01, 90.01, 93.01, 93.09, 93.11, 201.01, 93.17, 142.01, 142.17, 142.18, 221.08, 221.09, 207.02; 370/259, 432, 522

(56) References Cited

U.S. PATENT DOCUMENTS 5,610,910 A  *  3/1997  Focsaneanu et al. ........ 370/351

5,764,735 A  *  6/1998  Thorner .................... 379/93.07

OTHER PUBLICATIONS

ITU–T Recommendation I.240 (Extract from the Blue Book, Fasc. III.7), ITU 1988, 1993.

ITU–T Recommendation I.241.3 (Extract from the Blue Book, Fasc. III.7), ITU 1988, 1993.

ITU–T Recommendation I.210, 3/1993.

European digital cellular telecommunication system (Phase 2), Sep. 1994.

* cited by examiner

Primary Examiner—Benny Q. Tieu
(74) Attorney, Agent, or Firm—Bell, Boyd & Lloyd LLC

(57) ABSTRACT

The present invention is directed to a method and apparatus in a telecommunication network or data communication network for handling incoming call requests, given that subscribers would like to take advantage of different types of communication and data transmission such as voice telephony, sending faxes, etc., wherein it is possible for a subscriber in a communication network to route messages arriving in the communication network to, respectively, the most suitable terminal equipment.

8 Claims, 2 Drawing Sheets

METHOD AND APPARATUS IN A COMMUNICATION NETWORK FOR SWITCHING MESSAGES TO COMMUNICATION TERMINAL EQUIPMENT

BACKGROUND OF THE INVENTION

1. Field of the Invention

The present invention is directed to a method in a telecommunication network, or data communication network, for handling incoming call requests. It is assumed that subscribers wish to proceed with different types of communication and data transmission such as voice telephony, sending faxes, etc.

2. Description of the Prior Art

At the current time, voice telephony and fax service usually occur in switch-based telecommunication networks. A gain in significance of IP-based data communication networks can be registered, however, for the aforementioned and for new communication services.

The subscriber usually has a number of possibilities:

A suitable device may be employed for every type of communication data. The effect of this, however, is that the different devices are also given different telephone numbers of addresses. The calling subscriber must therefore store many numbers of addresses for a potential communication partner and must also store the respective allocation to the desired form of communication.

The employment of switch over (referred to as "fax shunt") enables, for example, the operation of a fax device and a telephone at one connection socket and, thus, enables telephoning and sending or receiving faxes over the same telephone number. After the acceptance of the connection, one waits for a specific fax signaling and the call is correspondingly handled further. This, however, is a specific solution that always incurs fees for the calling party since every call is accepted when it is a matter of the transmission of a fax.

The employment of multi-function devices; for example, a PC. Using specific conversion methods, for example, faxes can be converted into electronic mail.

Similar technical solutions like the fax shunt are increasing in significance in telecommunication and data communication networks. In private households, telephone and network PCs are usually connected to the same telephone line wherein there are substantial differences dependent on the modem version or the selected ISDN (Integrated Services Digital Network) terminal.

Computer-telephony-integration (CTI), for instance according to the telephony application programming interface (TAPI) or the more recent JTAPI (Java Telephony Application Interface) take all standard technical solutions into consideration for connecting a computer and a telephone to the network via the same line. Another possibility is that a computer and a telephone are associated with one another via two different lines or via coupled networks (for instance telephone line and LAN connection in corporation networks).

An object of the present invention is to specify a method wherein messages incoming for a subscriber in a communication network may be respectively forwarded to the most suitable terminal equipment.

SUMMARY OF THE INVENTION

Regarding the present invention, a telecommunication or data communication network is particularly composed of network nodes connected to one another. These usually have the possibilities of evaluating the destination address from an incoming message, such as a call request, and forwarding this on the basis of known information.

Given a connection setup request, a finding regarding what teleservice must be involved is already made in the network before the arrival at the destination subscriber. This can occur on the basis of specific signatures that are co-transmitted in the connection setup request and are interpreted by a switching node. The desired destination subscriber can be identified by the destination telephone number or, respectively, destination address. These two pieces of information are then forwarded to a suitable network element in this communication network. This network element then determines whether the selected number is suitable for the type of data transmission. When this is not the case, a "substitute" terminal equipment and the telephone number thereof can be determined wherein the desired connection is then setup thereto.

The critical advantage of this procedure is that communication can be carried out with every subscriber in the network in different ways via a quasi-unambiguous number. The calling party need only know this one number; the correct routing of the party's call to a suitable terminal equipment is assumed by instances in the network. The sending of faxes, for example, is thus significantly facilitated since, due to the unidirectional transmission from the recipient side, a transmission is always possible. Often, however, the specific number of the fax device or of smoother suitable terminal equipment is not known at the sender side.

Accordingly, means must be present in the telecommunication or data communication network for evaluating an incoming connection or transmission request. In addition to the destination telephone number, the nature of the desired communication also must be capable of being identified. In the network or the terminal equipment, for instance, a stored representation of the required information for evaluation of the determined information additionally exists. What is thereby particularly involved are the individual devices allocated to a subscriber and the characteristics thereof, as well as relationships between devices. On the basis of such information, the connection setup or data transmission request is routed to the most suitable terminal equipment—insofar as present—by switching centers in the network.

In the switching according to the inventive method, the central network element or cooperating, decentralized network elements (as in the Internet) are responsible for determining the destination address or telephone number. This determination can occur in various ways. A central data bank that is available to these network elements represents one possibility. This will be particularly employed when a data bank of this type is already present and can be supplemented and expanded with little outlay. The administration of the data bank is usually implemented proceeding from a central location. The access to such a data bank and, thus, the determination of the suitable destination telephone number or address usually occurs very quickly. The consistency of the data is assured due to the central data administration.

In another instance when such a data bank is not available or a frequent modification of the entries with a central administration is to be involved, some other solution of the problem must be found. It can be meaningful then that such information be stored in the terminal equipment. The central network element thereby implements the inquiry for the suitable destination telephone number or address not in a central data bank but at the respective, selected terminal equipment. This occurs in that, using an inquiry, the identified data (type of the data transmission) is transmitted to the terminal equipment which then communicates the desired destination telephone number to the central network element as replied.

The management of the information stored in the terminal equipment thereby can be assumed by the subscribers themselves. Both solutions play a mutually supplementary role, for instance, in computer telephony integration (CTI). The review of the compatibility of calling and called terminal equipment can also occur in various ways.

Additional flags, that point out the technical possibilities that a terminal equipment allocated to a number, can be established in a central data bank of the type already described above. What are particularly meant are the types of telecommunication that this device can handle; i.e., the corresponding teleservice. It is thereby definitely conceivable that one terminal equipment can process various types of teleservices, for instance a telephone with integrated fax device or a PC with the corresponding software. In addition, a software download can be initiated and the terminal equipment can be upgraded to the required functionality. A called terminal equipment is thus compatible with a calling terminal equipment when it can process the teleservice that is requested in the connection setup or data transmission signal.

Another solution would be a "test call" that is implemented by the central network unit at the terminal equipment. An inquiry (as already described above) is implemented again here, wherein the terminal equipment is asked whether it is compatible with a specific data service. This occurs without a connection setup and before either the actual connection setup or the actual data transmission. It is possible that all terminal equipment registered for a specific user are subsequently interrogated in this way and the message/connection is put through to that terminal equipment that is the first to report a compatibility.

Insofar as the communication is a matter of a unidirectional transmission, it is desirable from the viewpoint of the user that he is informed about the arrival of a message for him. This is particularly the case when an inventive rerouting has occurred before the transmission of the message.

Different possibilities are thereby conceivable. First, a determination must be made to where this modification must be sent. The destination subscriber can indicate a basic setting regarding the device at which he would like to receive a notification. Further, it is also conceivable that the notification is sent to the terminal equipment that was the last one used by the requested subscriber; for example, within a time frame.

Also, the form of the notification should be capable of being defined. Many possibilities are likewise conceivable here. First, there is the notification in the form of an announcement; for instance, via a telephone or on a call answering machine. However, various possibilities of visual display are also conceivable, for example at the telephone device of the subscriber in the form of a lamp or a symbol in the display field that lights up as soon as a message is present. Further, of course, the display can also be sent in the form of a short message to a mobile telephone (GSM) or as electronic mail or fax.

A notification function, for instance in the form of an announcement, also can be meaningful at the side of the sender. In that case, for instance, when a transmission cannot be carried out because the receiver does not have a suitable terminal equipment (for example, a fax device or a PC with fax module), the sender receives a brief message with the reason for the failure.

There are numerous central and decentralized solution possibilities in data communication networks. The exchange solutions (storing in the terminal equipment or, respectively, central data bank) were already briefly outlined. Other, distributed solutions are also conceivable.

Additional features and advantages of the present invention are described in, and will be apparent from, the Detailed Description of the Preferred Embodiments and the Drawings.

DETAILED DESCRIPTION OF THE PREFERRED EMBODIMENTS

There are already classes of pre-defined teleservices in some known types of telecommunication networks. For example, GSM (Global System for Mobile Communication) mobile radio telephone networks are included here. Three categories of teleservices are listed in the standard GSM 02.03:

voice communication (including emergency calls)

short message service SMS facsimile transmission.

The teleservices to be supported are also defined given ISDN (see ITU (International Telecommunication Union) Rec. I.240 with respect thereto):

telephony teletex telefax mixed mode videotex telex.

Further teleservices are conceivable given ISDN.

The computers for describing teleservices of ISDN are listed in standard ITU-T I.210 Annex C. The type of user information is, thereby, to be particularly noted. This type can be employed as signaling information.

Since teleservices are already defined and described in such networks, it follows that this available information should be employed. In these instances, no modification need be undertaken at the user side.

When no "type of user information" is co-supplied, other attributes also can be employed for describing the teleservices (see ITU I.210) that, in combination, likewise allow an unambiguous conclusion about the nature of the teleservice employed.

It is therefore also conceivable that service quality features are introduced that are directed, for example, to statements about the transmission quality, error elimination, authentification or encryption possibilities. These could then be utilized for the selection of a device when a plurality of devices for the same teleservice are available for a subscriber. The optimum workload of network and terminal equipment is thus assured.

In one exemplary embodiment, the possibility of transmitting faxes is also established in addition to normal speech communication. The teleservice relevant for sending faxes is defined in an ISDN network and is described in the standard ITU-T Recommendation I.241.3. Such service identifiers for data services are planned in data communication and are just being standardized by an IETF (Internet Engineering Task Force) Study Group. Indirect service identifiers such as, for example, file transfer protocol (FTP) have already existed for a longer time. The layer for router switches envisioned at the time consistently utilizes the service type (for instance FTP).

Figure 1:
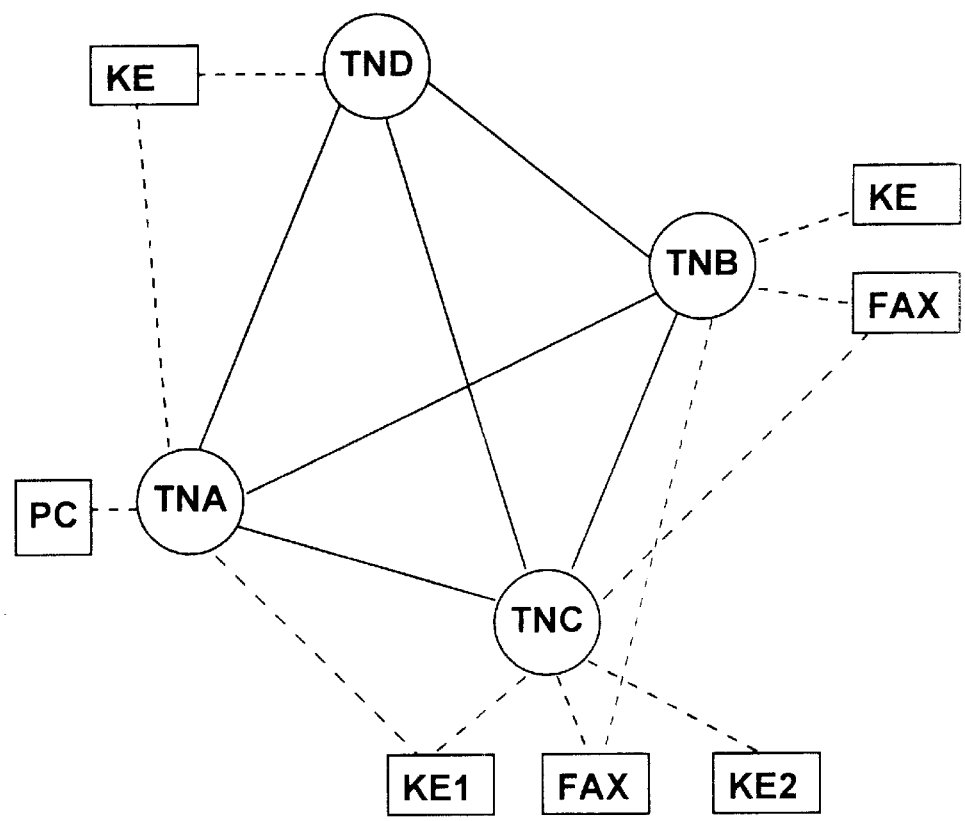
FIG. 1 shows a part of a communication network with subscribers (TNx) and various types of terminal equipment (KE, FAX, PC)

FIG. 1 thereby shows a possible excerpt from a telecommunication network. Four subscribers (TNA, TNB, TNC and TND) can communicate with one another. Each of these subscribers has at least one terminal equipment available. This exemplary network structure is a matter of specific fax devices (FAX), telephones (KE, KE1), mobile telephones (KE2) and personal computers (PC). Other possibilities of the network structure are, of course, conceivable.

Every subscriber has access to different terminal equipment; of course, a fax device can be used by a number of persons for receiving and for sending faxes. This is also true of all other types of terminal equipment, particularly for specific equipment such as mobile telephones. The criteria according to which this terminal equipment is used is left up to every subscriber. Thus, a number of employees of a company can use the same fax device. Likewise, an employee can have faxes directed to him routed to the company during the day and rerouted home in the evening.

The technology of the "intelligent network" is employed for realizing the desired function. An intelligent network is an architecture that makes it possible for a network operator or some other service vendor to offer added value services for the service user in a telecommunication network. This technology, with which a person skilled in the art is familiar, particularly contains specific components that enable the necessary data administration and, in addition to the simple realization of these services, also enables the reliable and secure administration of the stored data.

A central component of the intelligent network is responsible for storing the required information. In particular, this is the operation of information about subscribers, their telephone numbers, as well as the destination telephone numbers of additional specific devices and information about the type of respective data transmission. Additional rules are also conceivable that, for instance, control the routing according to the time of day, according to the telephone number of the calling party (for example, confidential transmissions are separately handled, the separation of private and business transmissions) or the like.

Figure 2:
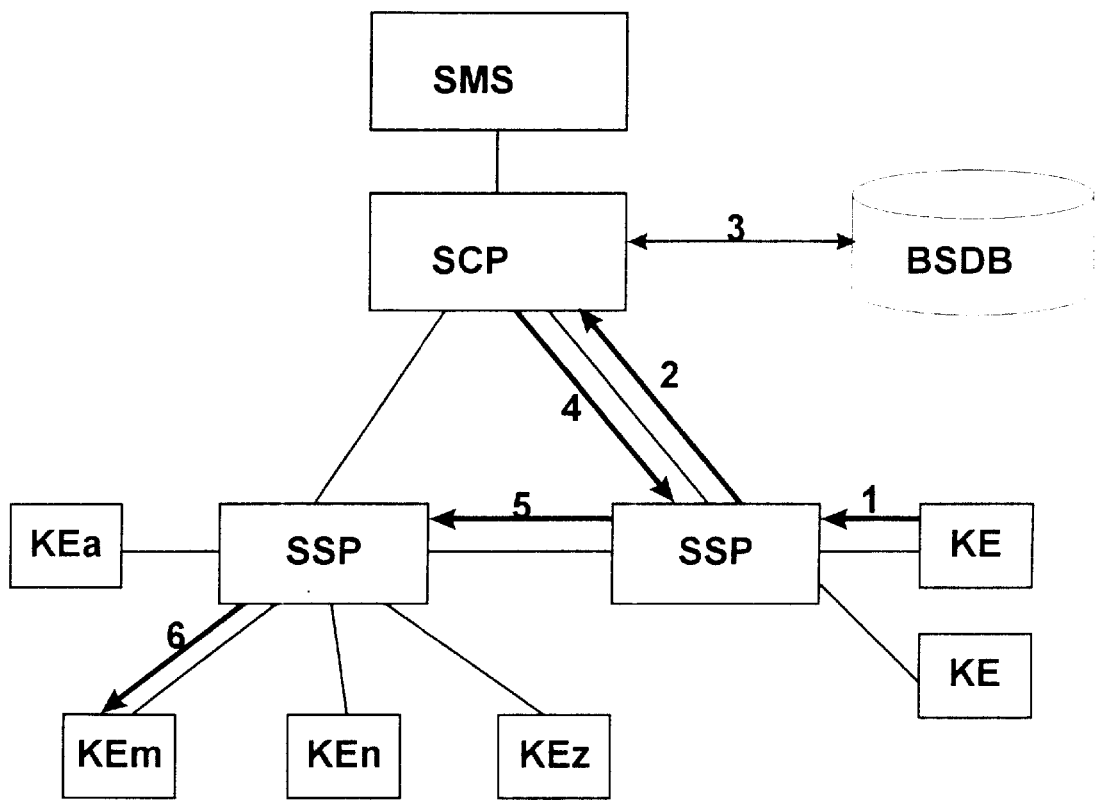
FIG. 2 shows a schematic illustration of the potential of a possibility of processing a connection setup request in a telecommunication network that was sent by a subscriber (KE). This is the most common form of what is referred to as a central intelligent network (IN) solution.

FIG. 2 shows a basic execution of a successful connection setup. The illustration does not represent the complete network structure but only the participating components that are critical for the connection setup. At the transmission side, a subscriber sends a fax to a second subscriber of the communication network (1) with a suitable communication terminal equipment (KE). The connection setup request arrives at a first service switching point SSP. A processing of the call occurs here according to the basic call state model (BCSM) from the capability set 1 (CS-1) for intelligent networks. What are referred to as detection points are used. The SSP, when processing the incoming call, thus knows that an IN (Intelligent Network) call can be present and, thus, a central instance in the IN must be asked for further instructions.

Based on the incoming connection setup request, the SSP also can determine what type of transmission is involved; i.e., what teleservice. The SCP request must contain information about the desired teleservice and about the destination telephone number; i.e., the selected subscriber (2).

The central network component for the control of the services is the service control point SCP. The SCP receives an inquiry of the SSP. In addition, the SCP has access to the information about the subscribers of the communication network. The SCP can now determine the destination telephone number (3) from the co-supplied information and from this central data bank (DSDB).

Particularly when the identified teleservice is "telefax," but the terminal equipment connected at the selected number is not a fax device but, for example, a traditional telephone set that cannot receive a fax, the advantage of the inventive procedure takes effect. The sender of a message often only knows one telephone number of the communication partner he would like to contact. Thus, it frequently occurs that a sender with a fax device with repeat dial vainly attempts over and over to send a message. The new destination telephone number calculated by the SCP is then sent back (4) to the SSP as reply to the inquiry. This destination telephone number can differ from the original telephone number. The switching node (SSP) can now setup (5), (6) the connection as usual with the newly identified destination telephone number or, respectively, the terminal equipment (KEm) appertaining thereto.

It is possible that no suitable terminal equipment (for example, a fax device) is registered in the data bank for the requested subscriber. The SCP then cannot identify a destination telephone number. In this case, the SSP could play an announcement or generate a message that is delivered to the sender of the original message and informs him that a connection setup is not possible. In addition, further information about the reason for the failure could be communicated.

Although the present invention has been described with reference to specific embodiments, those of skill in the art will recognize that changes may be made thereto without departing from the spirit and scope of the invention as set forth in the hereafter appended claims.

List of References

ITU-T I.240
  Integrated Services Digital Network (ISDN)
  Service Capabilities
  Definition of Teleservices
  ITU-T Recommendation I.240 (Extract from the Blue Book, Fasc. III.7), ITU 1988,
ITU-T I.241.3
  Integrated Services Digital Network (ISDN)
  Service Capabilities
  Teleservices Supported by an ISDN: Telefax4
  ITU-T Recommendation I.241.3 (Extract from the Blue Book, Fasc. III.7), ITU 1988, 1993
ITU-T I.210
  Integrated Services Digital Network (ISDN)
  Service Capabilities
  Principles of Telecommunication Services supported by an ISDN and the means to describe them
  ITU-T Recommendation I.210, March 1993
ETS 300 502
  European digital cellular telecommunication system (Phase 2);
  Teleservices supported by a GSM, public land mobile network (PLMN), (GSM 02.03), September 1994

I claim as my invention:

1. A method for switching messages in a communication network, the method comprising the steps of:
    sending a connection setup request from a calling subscriber at a calling terminal equipment to a selected subscriber at a called terminal equipment;
    determining a type of teleservice involved in the connection setup request;
    informing a suitable network element in the communication network about the connection setup request;
    checking whether the called terminal equipment can satisfy the connection setup request via an inquiry at the called terminal equipment at the time of the connection setup request; and
    determining a rerouting address of a compatible terminal equipment pursuant to an interrogation at the called terminal equipment at the time of the connection setup request;
    rerouting the connection setup request to the compatible terminal equipment when the called terminal equipment cannot satisfy the connection setup request.

2. A method for switching messages in a communication network as claimed in claim 1, wherein the step of checking whether the called terminal equipment can satisfy the connection setup request occurs using the suitable network element in the communication network.

3. A method for switching messages in a communication network as claimed in claim 1, wherein a teleservice identifier is co-supplied with the connection setup request and is simultaneously considered in the step of checking whether the called terminal equipment can satisfy the connection setup request.

4. A method for switching messages in a communication network as claimed in claim 1, wherein the connection setup request is a unidirectional data transmission which is rerouted, if necessary, to a compatible terminal equipment such that a notification about the arrival of the connection setup message is generated and sent to the selected subscriber.

5. A method for switching messages in a communication network as claimed in claim 4, wherein the notification appears in the form of a visual display in a terminal equipment of the selected subscriber.

6. A method for switching messages in a communication network as claimed in claim 4, wherein the notification occurs in the form of an announcement in a terminal equipment of the selected subscriber.

7. A method for switching messages in a communication network as claimed in claim 1, wherein, when no compatible terminal equipment is available, the calling subscriber is sent a message prior to the connection setup request being aborted.

8. An apparatus for allocating an incoming connection setup request to terminal equipment in a communication network, comprising:
    means for determining information about the incoming connection setup request;
    means for storing information about subscribers in the communication network;
    means for storing information about terminal equipment in the communication network, the information about terminal equipment including type of equipment and allocation to subscriber;
    means for evaluating acquired information at a called terminal equipment at the time of the connection setup request; and
    means for producing a connection to a previously identified, suitable terminal equipment of the requested subscriber, the previously identified, suitable terminal equipment being determined at the called terminal equipment at the time of the connection setup request.

* * * * *